(12) United States Patent
Baldwin et al.

(10) Patent No.: US 9,600,079 B2
(45) Date of Patent: Mar. 21, 2017

(54) SURFACE DETERMINATION VIA BONE CONDUCTION

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/514,658

(22) Filed: Oct. 15, 2014

(65) Prior Publication Data

US 2016/0109951 A1   Apr. 21, 2016

(51) Int. Cl.
*G06F 3/01* (2006.01)
*G08C 17/02* (2006.01)

(52) U.S. Cl.
CPC ............. *G06F 3/017* (2013.01); *G08C 17/02* (2013.01)

(58) Field of Classification Search
CPC  G08C 17/02; G08C 2201/93; G08C 2201/30; G08C 23/04; G08C 2201/20; G08C 2201/92; G08C 2201/32
USPC ........................................................ 340/12.5
See application file for complete search history.

(56) References Cited

U.S. PATENT DOCUMENTS

| | | | |
|---|---|---|---|
| 3,629,521 A | 12/1971 | Puharich et al. | |
| 4,048,986 A | 9/1977 | Ott | |
| 4,340,778 A | 7/1982 | Cowans et al. | |
| 4,421,119 A | 12/1983 | Pratt | |
| 4,720,607 A | 1/1988 | de Moncuit | |
| 4,754,763 A | 7/1988 | Doemland | |
| 4,799,498 A | 1/1989 | Collier | |
| 5,024,239 A | 6/1991 | Rosenstein | |
| 5,073,950 A | 12/1991 | Colbert et al. | |
| 5,319,747 A | 6/1994 | Gerrissen et al. | |
| 5,327,506 A | 7/1994 | Stites, III | |
| 5,368,044 A | 11/1994 | Cain et al. | |
| 5,495,241 A | 2/1996 | Doing et al. | |

(Continued)

FOREIGN PATENT DOCUMENTS

| AU | 2003257031 | 2/2004 |
|---|---|---|
| AU | 2007200415 | 8/2007 |

(Continued)

OTHER PUBLICATIONS

Rekimoto, Jun, "Gesture Wrist and GesturePad: Unobtrusive Wearable Interaction Devices," 2001, Fifth International Symposium on Wearable Computers, IEEE.

(Continued)

*Primary Examiner* — Mark Blouin
(74) *Attorney, Agent, or Firm* — Hartman & Citrin LLC

(57) ABSTRACT

Concepts and technologies are disclosed herein for surface determination via bone conduction. According to one aspect, a user device can identify a surface via bone conduction. The user device can identify one or more controllable devices to control using the surface. The user device can detect a user interaction, such as a gesture, performed by a user on the surface. The user device can provide an instruction to the controllable device(s) to cause the controllable device(s) to perform one or more operations in response to the user interaction with the surface.

17 Claims, 10 Drawing Sheets

(56) References Cited

U.S. PATENT DOCUMENTS

| | | |
|---|---|---|
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto et al. |
| 6,396,930 B1 | 5/2002 | Vaudrey et al. |
| 6,409,684 B1 | 6/2002 | Wilk |
| 6,507,662 B1 | 1/2003 | Brooks |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,386,962 B2 | 7/2016 | Dahl |
| 2001/0013546 A1 | 8/2001 | Ross |
| 2001/0051776 A1 | 12/2001 | Lenhardt |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskus et al. |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0280239 A1 | 11/2011 | Tung |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1 | 6/2013 | Amento et al. |
| 2013/0170471 A1 | 7/2013 | Nix |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0278396 A1* | 10/2013 | Kimmel .............. G08C 17/02 340/12.5 |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0156854 A1 | 6/2014 | Gaetano, Jr. |
| 2014/0168093 A1 | 6/2014 | Lawrence |
| 2014/0168135 A1 | 6/2014 | Saukko et al. |
| 2014/0174174 A1 | 6/2014 | Uehara et al. |

(56) References Cited

U.S. PATENT DOCUMENTS

| | | |
|---|---|---|
| 2014/0188561 A1 | 7/2014 | Tenbrock et al. |
| 2014/0210791 A1 | 7/2014 | Hanauer et al. |
| 2014/0240124 A1 | 8/2014 | Bychkov |
| 2015/0084011 A1 | 3/2015 | Park et al. |
| 2015/0092962 A1 | 4/2015 | Amento et al. |
| 2015/0120465 A1 | 4/2015 | Baldwin et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |
| 2015/0138062 A1 | 5/2015 | Baldwin et al. |
| 2015/0150116 A1 | 5/2015 | Baldwin et al. |
| 2015/0199950 A1 | 7/2015 | Heiman |

FOREIGN PATENT DOCUMENTS

| | | | |
|---|---|---|---|
| CA | 1207883 | 7/1986 | |
| EP | 0712114 | 5/1996 | |
| EP | 0921753 | 6/1999 | |
| EP | 1436804 | 2/2004 | |
| EP | 2312997 | 4/2011 | |
| EP | 2643981 | 5/2012 | |
| EP | 2483677 | 8/2012 | |
| GB | 2226931 | 7/1990 | |
| GB | 2348086 | 9/2000 | |
| JP | 02249017 | 10/1990 | |
| JP | 04-317638 A | 11/1992 | |
| JP | 2003058190 | 2/2003 | |
| JP | 2005142729 A * | 6/2005 | ............ G08C 17/02 |
| JP | 2010210730 | 9/2010 | |
| KR | 20100056688 | 10/1990 | |
| TW | 200946887 | 8/1997 | |
| WO | WO 8201329 | 4/1982 | |
| WO | WO 9601585 | 1/1996 | |
| WO | WO 03033882 | 4/2003 | |
| WO | WO 2006094372 | 9/2006 | |
| WO | WO 2009001881 | 12/2008 | |
| WO | WO 2010045158 | 4/2010 | |
| WO | WO 2012168534 | 12/2012 | |

OTHER PUBLICATIONS

Amento et al., "The Sound of One Hand: A Wrist-mounted Bio-acoustic Fingertip Gesture Interface," CHI 2002: changing the world, changing ourselves, Apr. 20-25, 2002, pp. 724-725, ACM.

U.S. Office Action dated Aug. 25, 2015 in U.S. Appl. No. 11/586,142.

U.S. Office Action dated Aug. 25, 2015 in U.S. Appl. No. 14/083,094.

U.S. Office Action dated Jun. 25, 2015 in U.S. Appl. No. 14/083,110.

U.S. Appl. No. 14/482,087, filed Sep. 10, 2014.

U.S. Appl. No. 14/482,091, filed Sep. 10, 2014.

U.S. Appl. No. 14/482,101, filed Sep. 10, 2014.

U.S. Appl. No. 14/482,078, filed Sep. 10, 2014.

Zhong et al., "OsteoConduct: Wireless Body-Area Communication based on Bone Conduction," Proceeding of the ICST 2nd International Conference on Body Area Networks, BodyNets 2007.

Travis et al., "Hambone: A bio-acoustic gesture interface," 2007 11th IEEE International Symposium on Wearable Computers, 2007.

Scanlon, Michael V. Acoustic sensor for health status monitoring. Army Research Lab Aberdeen Proving Ground MD, 1998.

Yamada, Guillaume Lopez; Masaki Shuzo; Ichiro. "New healthcare society supported by wearable sensors and information mapping-based services." International Journal of Networking and Virtual Organisations 9.3 (2011): 233-247.

Scanlon, Michael V. "Acoustic sensors in the helmet detect voice and physiology." AeroSense 2003. International Society for Optics and Photonics, 2003.

"Kinect Gestures," retrieved from http://support.xbox.com/en-US/xbox-360/kinect/body-controller on Oct. 24, 2013.

Mark Billinghurst, "Chapter 14: Gesture Based Interaction," Haptic Input, Aug. 24, 2011.

Kompis, Martin, and Rudolf Haeusler, "Electromagnetic interference of bone-anchored hearing aids by cellular phones revisited," Acta oto-laryngologica 122.5, 2002, 510-512.

Chris Harrison, Desney Tan, Dan Morris, "Skinput: Appropriating the Skin as an Interactive Canvas," CommuniCations of the ACM 54.8, 2011, 111-118.

T. Scott Saponas, et al., "Enabling always-available input with muscle-computer interfaces," Proceedings of the 22nd Annual ACM Symposium on User Interface Software and Technology, ACM, 2009.

Jao Henrique Donker, "The Body as a communication medium," 2009.

Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

Vidya Bharrgavi, et al., "Security Solution for Data Integrity in Wireless BioSensor Networks," Distributed Computing Systems Workshops, 2007, ICDCSW'07, 27th International Conference, IEEE, 2007.

Daniel Halperin, et al., "Pacemakers and Implantable Cardiac Defibrillators: Software Radio Attacks and Zero-Power Defenses," Security and Privacy, SP 2008, IEEE Symposium, IEEE, 2008.

Carmen C. Y. Poon, et al., "A Novel Biometrics Method to Secure Wireless Body Area Sensor Networks for Telemedicine and M-Health," Communications Magazine, IEEE 44.4, 2006, 73-81.

Zicheng Liu, et al., "Direct Filtering for Air-and Bone-Conductive Microphones," Multimedia Signal Processing, 2004 IEEE 6th Workshop, IEEE, 2004.

Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.

Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.

Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.

Ni, Tao, and Patrick Baudisch. "Disappearing mobile devices." Proceedings of the 22nd annual ACM symposium on User interface software and technology. ACM, 2009.

Hinckley, Ken, and Hyunyoung Song, "Sensor synaesthesia: touch in motion, and motion in touch." Proceedings of the SIGCHI Conference on Human Factors in Computing Systems. ACM, 2011.

Hinge, Dhanashree, and S. D. Sawarkar. "Mobile to Mobile data transfer through Human Area Network." IJRCCT 2.11 (2013): 1181-1184.

Park, Duck Gun, et al. "TAP: touch-and-play." Proceedings of the SIGCHI conference on Human Factors in computing systems. ACM, 2006.

Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.

Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.

Lipkova, Jolana, and Jaroslav Cechak. "Transmission of Information Using the Human Body.".

Maruf, Md Hasan. "An Input Amplifier for Body-Channel Communication." (2013).

U.S. Office Action dated Feb. 13, 2013 in U.S. Appl. No. 13/309,124.

U.S. Office Action dated Sep. 24, 2013 in U.S. Appl. No. 13/309,124.

(56) References Cited

OTHER PUBLICATIONS

U.S. Office Action dated Jan. 29, 2014 in U.S. Appl. No. 13/309,124.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
U.S. Office Action dated Dec. 17, 2015 in U.S. Appl. No. 14/065,663.
U.S. Office Action dated Nov. 19, 2015 in U.S. Appl. No. 14/083,499.
U.S. Office Action dated Nov. 19, 2015 in U.S. Appl. No. 14/090,668.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Notice of Allowance dated Mar. 21, 2016 in U.S. Appl. No. 14/090,668.
U.S. Office Action dated Mar. 16, 2016 in U.S. Appl. No. 14/482,087.
U.S. Office Action dated Mar. 10, 2016 in U.S. Appl. No. 14/482,091.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Notice of Allowance dated Oct. 7, 2016 in U.S. Appl. No. 15/224,808.
U.S. Non-Final Office Action dated Oct. 20, 2016 in U.S. Appl. No. 14/482,078.

* cited by examiner

SURFACE DETERMINATION VIA BONE CONDUCTION

BACKGROUND

Bone conduction is a developing communication technology with numerous potential applications. Context computing and situational behavior technology is also becoming increasingly useful. A major benefit of bone conduction-based gestures is that bone conduction-based gestures enable control and manipulation of remote systems without having to interact with a traditional physical interface such as a mobile device touchscreen. For this reason, bone conduction-based gestures are much more personal, convenient, and natural for users. Bone conduction-based gestures and touch/surface gestures (e.g., pinching, sliding, etc.) in general are limited in the quantity of relatively simple distinct movements that can be used. This limitation can cause issues, delays, and additional user effort when more than one system can be controlled using gestures due to reuse of some or all gesture commands. A user's location, such as their living room, is insufficient information to automatically select the system a gesture is intended to control. This issue will only become more common as increasing numbers of objects become intelligent and/or controllable remotely.

SUMMARY

Concepts and technologies are disclosed herein for surface determination via bone conduction. According to one aspect, a user device can identify a surface via bone conduction. The user device can identify one or more controllable devices to control using the surface. The user device can detect a user interaction, such as a gesture, performed by a user on the surface. The user device can provide an instruction to the controllable device(s) to cause the controllable device(s) to perform one or more operations in response to the user interaction with the surface.

In some embodiments, the user device can generate a bone conduction signal, and can send, via a transducer, the bone conduction signal through one or more bones of a user and through the surface. The user device can receive, via the transducer, a modified bone conduction signal. The modified bone conduction signal can include the bone conduction signal as modified by the bone(s) of the user and the surface. The user device can remove, from the modified bone conduction signal, a body characteristic associated with an effect of the bone of the user on the bone conduction signal. The user device can compare the modified bone conduction signal sans the body characteristic to a plurality of surface signatures of a reference database. The reference database can be stored in a memory of the user device and/or can be accessed remotely via a network. The user device can receive, from the reference database, a surface identification associated with a surface signature of the plurality of surface signatures. The surface signature can uniquely identify the surface to the user device.

In some embodiments, the user device can identify the controllable device to control using the surface by querying a reference database to determine whether any controllable device is associated with a surface signature and by receiving, from the reference database, a controllable device identification associated with the controllable device. The controllable device identification can identify the controllable device to the user device.

In some embodiments, the user device can establish a connection to a controllable device via a local network. In these embodiments, the user device can provide the instruction to the controllable device via the connection established via the local network.

In some embodiments, the user device can detect a gesture performed by a user who is in physical contact with the surface. The gesture can be detected by the user via bone conduction. In some embodiments, the user device can generate a gesture measurement signal, send the gesture measurement signal through a bone of the user and through the surface while the user is in physical contact with the surface, and receive a modified gesture measurement signal. The modified gesture measurement signal can include the bone conduction signal as modified by the bone of the user and the surface. The user device can compare the modified gesture measurement signal to a reference database. The reference database can include a plurality of user interaction identifications. Each of the plurality of user interaction identifications can be associated with signal characteristics of a user interaction. The user device can determine the gesture based upon the comparison of the modified gesture measurement signal to the reference database.

In some embodiments, the user device can prompt a user to contact the surface. The user device can generate a measurement signal. The user device can send, via a transducer, the measurement signal through a bone of the user and through the surface. The user device can receive a modified measurement signal. The user device can remove, from the modified bone conduction signal, a body characteristic associated with an effect of the bone of the user on the bone conduction signal. The user device can compare the modified bone conduction signal sans the body characteristic to the measurement signal to isolate a surface signature associated with the surface. The user device can cause the surface signature to be saved in a reference database in association with a surface identification.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
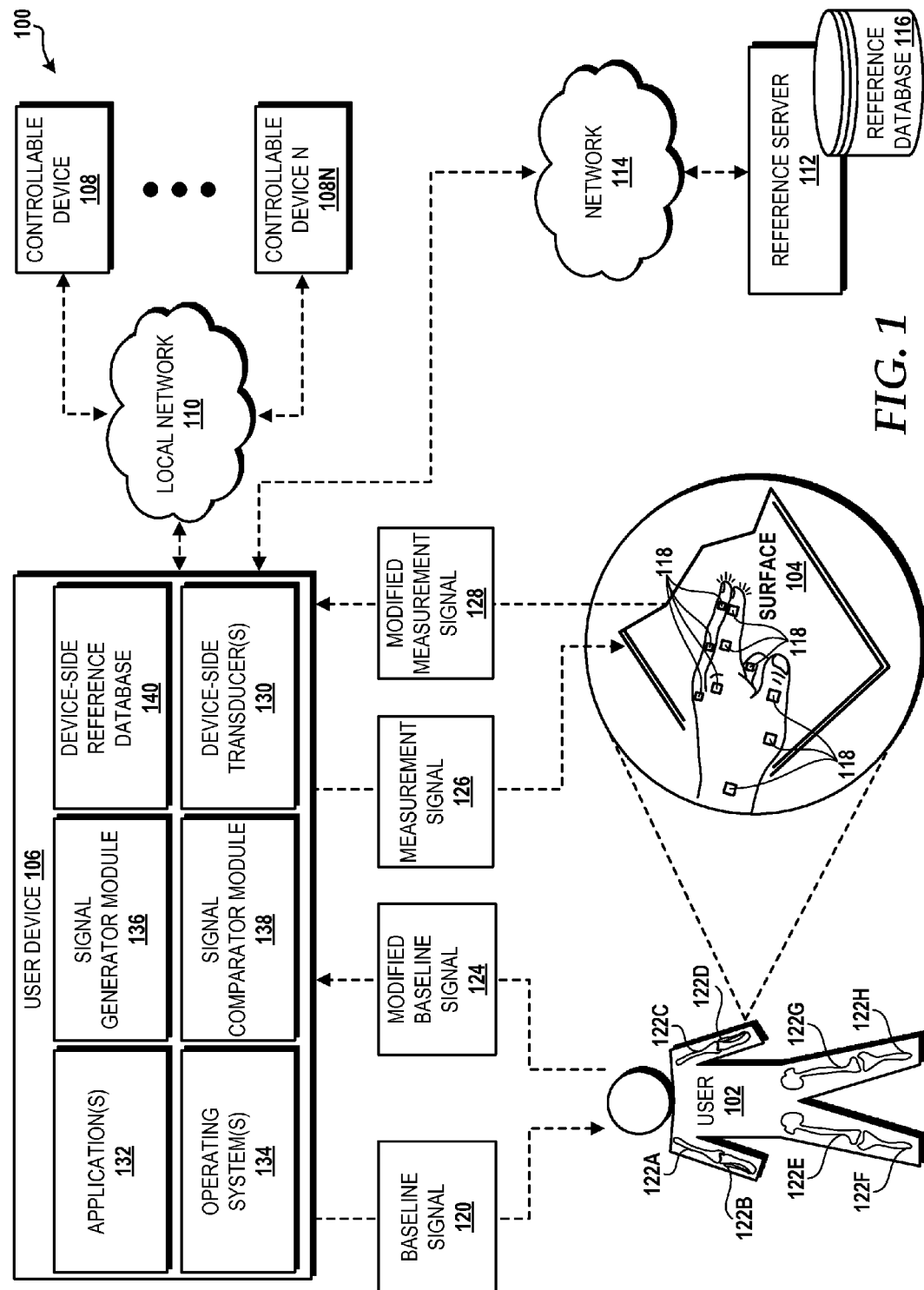
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of surface determination via bone conduction will be presented.

Referring now to FIG. 1, aspects of an operating environment 100 in which various embodiments presented herein may be implemented will be described, according to an illustrative embodiment. The operating environment 100 shown in FIG. 1 facilitates the use of bone conduction techniques to allow a user 102 to interact with any surface, such as a surface 104, to generate input that can be provided to a user device 106. The user device 106 can analyze the input to determine instructions to provide to one or more controllable devices 108-108N (controllable device(s) 108). The instructions can instruct the controllable device(s) 108 to perform one or more operations.

By identifying characteristics of the surface 104 through the bone conduction techniques described herein, the surface 104 can be uniquely identified so as to distinguish the surface 104 from other surfaces (not shown). In this manner, the user 102 can control different controllable devices of the controllable devices 108 using the same user interaction, such as a gesture performed by the user 102, by interacting with different surfaces. For example, the surface 104 can be associated with the control of a first controllable device of the controllable devices 108 and another surface (not shown) can be associated with the control of a second controllable device of the controllable device 108. In some embodiments, the surface 104 can be associated with the control of multiple controllable devices. In some embodiments, other factors, such as the time of day or day of week, can be utilized to determine which of the controllable devices 108 the surface 104 should control. For example, the user 102 can interact with the surface 104 to control a first controllable device of the controllable devices 108 between 7 AM and 9 AM, and the user 102 can interact with the surface 104 to control a second controllable device of the controllable devices 108 between 7 PM and 9 PM.

The surface 104 can be formed, at least in part, from any material or combination of materials, some examples of which include plastic, composite, metal, paper, cardboard, ceramic, and wood. In some embodiments, the surface 104 is at least a portion of an object, built-in to an object, temporarily attached to an object, or permanently attached to an object. By way of example, and not limitation, the object may be a package, a device, a clothing piece, a clothing accessory piece, a furniture piece, an appliance, a vehicle, a tool, a wall, a door, or a building structure. The surface 104 may be attached to a person, such as the user 102.

The user device 106, in some embodiments, is or includes a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like. It should be understood that the functionality of the user device 106 can be provided by a single device, by two or more similar devices, and/or by two or more dissimilar devices.

Each of the controllable devices 108, in some embodiments, is or includes a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a PDA, combinations thereof, or the like. It should be understood that the functionality of the user device 106 can be provided by a single device, by two or more similar devices, and/or by two or more dissimilar devices.

In the illustrated example, the user device 106 is in communication with the controllable devices 108 via a local network 110. The local network 110 can be or can include, for example, one or more wireless local area networks ("WLAN"), one or more wireless metropolitan area networks ("WMANs"), one or more wireless campus area networks ("WCANs"), and/or one or more wireless personal area networks ("PANs"). The local network 110 can operate in accordance with any networking technology, including standardized, non-standardized, and proprietary wireless and wired networking technologies, some examples of which include WI-FI, other radio frequency ("RF"), infrared, and the like. As such, the local network types and technologies disclosed herein should not be construed as being limiting in any way.

In the illustrated example, the user device 106 also is in communication with a reference server 112 via a network 114. The network 114 can be or can include, for example, one or more wide area networks ("WANs") and/or one or more packet data networks such as the Internet or a portion thereof. The network 114 embodied as a WWAN may use any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The network 114 embodied as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

Figure 2:
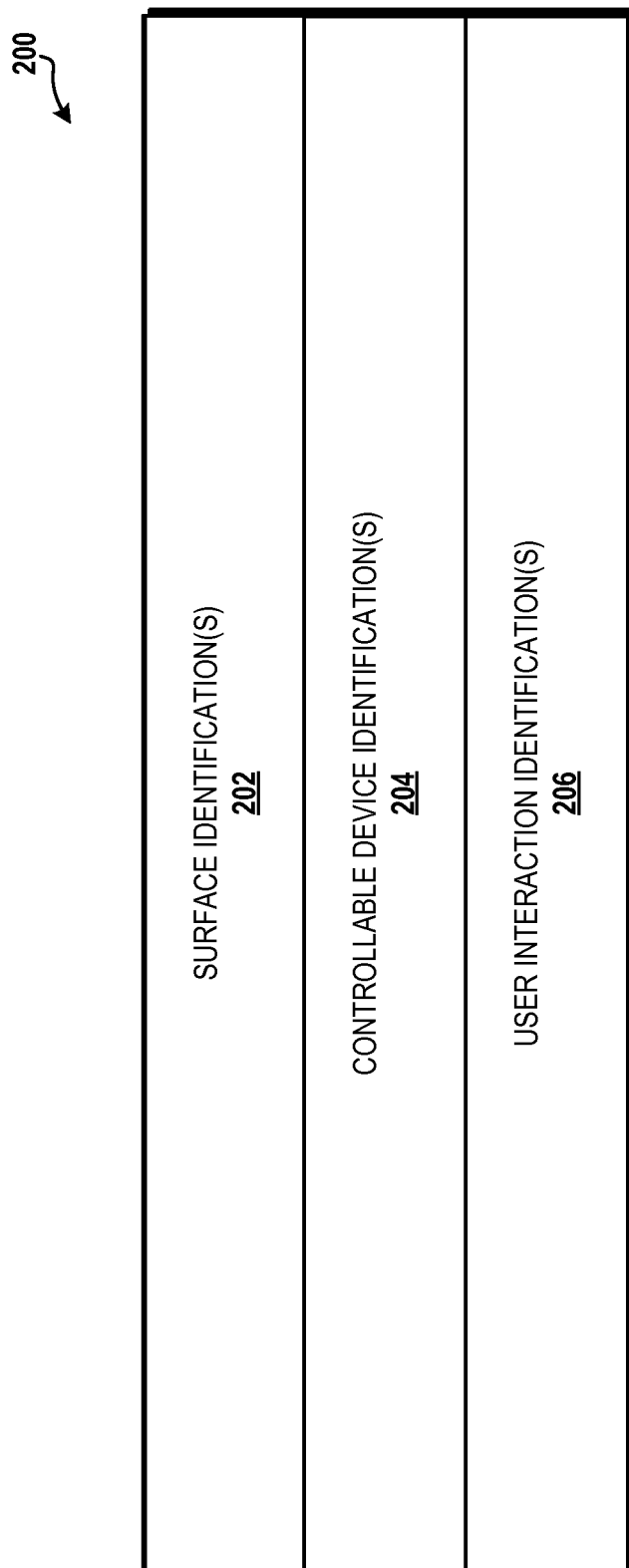
FIG. 2 is a diagram illustrating aspects of example data that can be stored in a reference database, according to an illustrative embodiment.

The reference server 112 can host a reference database 116. Referring briefly to FIG. 2, example data 200 that can be provided by the reference database 116 is illustrated, according to an illustrative embodiment. The example data 200 includes one or more surface identifications 202, one or more controllable device identifications 204, and one or more user interaction identifications 206.

The surface identification(s) 202 can be one or more letters, numbers, characters, punctuation, photographs, pictures, sounds, videos, universal product codes ("UPCs"), text descriptions, any combination thereof, and the like that can be used to uniquely identify surfaces such as the surface 104. The surface identifications 202 each can be associated with one or more of the controllable device identifications 204 and/or one or more of the user interaction identifications 206.

The controllable device identifications 204 can be one or more letters, numbers, characters, punctuation, photographs, pictures, sounds, videos, UPCs, text descriptions, serial numbers, media access control ("MAC") addresses, internet protocol ("IP") addresses, international mobile equipment identity ("IMEI"), any combination thereof, and the like that can be used to uniquely identify controllable devices such as the controllable devices 108. The controllable device identifications 204 each can be associated with one or more of surface identifications 202 and/or one or more of the user interaction identifications 206.

The user interaction identifications 206 can be one or more letters, numbers, characters, punctuation, photographs, pictures, sounds, videos, text descriptions, any combination thereof and the like that can be used to uniquely identify user interactions such as gestures performed by the user 102 while the user 102 is in physical contact with the surface 104. The user interaction identifications 206 each can be associated with one or more of surface identifications 202 and/or one or more of the controllable device identifications 204.

The user interaction identifications 206 can identify user interactions such as discrete touches, single touch gestures, and multi-touch gestures. Several gestures will now be described. It should be understood that these gestures are illustrative and are not intended to limit the scope of the appended claims. Moreover, the user 102, a developer, and/or another entity may create gestures.

In some embodiments, the user 102 can perform a tap gesture in which the user 102 taps the surface 104. The tap gesture may be used for various reasons including, but not limited to, opening or launching an application, selecting an item visible on a display associated with one or more of the controllable devices 108, and/or the like. In some embodiments, the user 102 can perform a double tap gesture in which the user 102 taps the surface 104 twice. The double tap gesture may be used for various reasons including, but not limited to, zooming in or zooming out in stages on a graphical user interface ("GUI") element presented on a display associated with one or more of the controllable devices 108. In some embodiments, the user 102 can perform a tap and hold gesture in which the user 102 taps the surface 104 and maintains contact for at least a pre-defined time. The tap and hold gesture may be used for various reasons including, but not limited to, opening a context-specific menu presented on a display associated with one or more of the controllable devices 108.

In some embodiments, the user 102 can perform a pan gesture in which the user 102 places a finger on the surface 104 and maintains contact with the surface 104 while moving the finger on the surface 104. The pan gesture may be used for various reasons including, but not limited to, moving through screens, images, or menus presented on a display associated with one or more of the controllable devices 108 at a controlled rate. Multiple finger pan gestures are also contemplated. In some embodiments, the user 102 can perform a flick gesture in which a user swipes a finger in the direction the user wants the screen to move. The flick gesture may be used for various reasons including, but not limited to, scrolling horizontally or vertically through menus or pages presented on a display associated with one or more of the controllable devices 108. In some embodiments, the user 102 can perform a pinch and stretch gesture in which the user 102 makes a pinching motion with two fingers (e.g., thumb and forefinger) on the surface 104 or moves the two fingers apart in a stretching motion. The pinch and stretch gesture may be used for various reasons including, but not limited to, zooming gradually in or out of a website, map, or picture that is presented on a display associated with one or more of the controllable devices 108.

Although the above gestures have been described with reference to the use one or more fingers for performing the gestures on the surface 104, other appendages such as toes may be used to interact with the surface 104. Moreover, the above gestures are not limited to causing the aforementioned effects, and may in addition or in the alternative cause other effects such as, for example, powering on or powering off one or more of the controllable devices 108, adjusting a volume of one or more speakers associated with one or more of the controllable devices 108, adjusting a brightness of one or more display associated with one or more of the controllable devices 108, and/or the like. As such, the above gestures should be understood as being illustrative and should not be construed as being limiting in any way.

The reference database 116 can be constructed and enhanced through repeated use of the methods described herein for capturing data about the surface 104, the controllable device(s) 108, and/or the user interaction(s). In some implementations, data provided by the reference database 116 is crowd-sourced from multiple user devices. Identification of the surface 104 can accompany data captured using the passive and active methods described herein. The known impacts of the body of the user 102 can be removed prior to sending the data or can be sent along with the data to be removed later. Machine learning can be used to assemble the data into the reference database 116 to be used for real-time or near real-time identification of the surface 104.

Turning back to FIG. 1, the illustrated example shows the user 102 in contact with the surface 104. In particular, two fingers on a hand of the user 102 are shown in contact with the surface 104 to perform one or more user interaction such as described above. The user 102 is associated with one or more user side transducers 118. The user side transducer(s) 118, in some embodiments, are piezoelectric transducers, such as contact microphones or other electro-acoustic transducers. The user side transducer(s) 118 can be built-in to a wearable device (not shown). The user side transducer(s) 118 can be attached to a wearable device. The user side transducer(s) 118 can be built-in to another device that is attached to or worn by the user 102. The user side transducer(s) 118 can be attached to another device that is attached to or worn by the user. In the illustrated embodiment, the user side transducer(s) 118 are attached to or worn directly on the skin (e.g., as a tattoo or part of a tattoo), underneath the skin, or within the body of the user (e.g., as an implantation device). The user side transducer(s) 118 alternatively can be built-in to or attached to a glove or other clothing worn by the user 102. As such, the user side transducer(s) 118 as illustrated should not be construed as being limiting in any way. The user side transducer(s) 118 can provide signals back to the user device 106, can amplify signals, and can be used to provide feedback regarding changes to signals propagating through certain portions of a body of the user 102.

The body of the user 102 can receive a baseline reference signal 120 ("baseline signal 120") from the user device 106. The baseline signal 120 can propagate through the body of the user 102, and more particularly, through one or more bones 122A-122H of the user 102. The baseline signal 120 as modified by the body of the user 102 a ("modified baseline signal 124") when the user 102 is not in contact with the surface 104 can be compared against the baseline signal 120 to determine how the body of the user 102 affects one or more characteristics (e.g., frequency, amplitude, and/or phase) of the baseline signal 120. One or more signal characteristics (e.g., amplitude, frequency, and/or phase) can be modified during propagation through the body of the user 102 by, for example, the height, weight, body fat percentage, body muscle percentage, and/or bone characteristics such as bone density, bone structure, and bone mass of the body of the user 102. These changes in signal characteristics (hereinafter referred to as "body characteristics") can be removed from future signals to isolate the effects of the surface 104. The modified baseline signal 124 and/or the body characteristics can be stored in a memory device (best shown in FIG. 8) of the user device 106.

The modified baseline signal 124 can be compared to future signals, such as a measurement signal 126 as modified by the body of the user 102 and the surface 104 ("modified measurement signal 128") when the user 102 is in contact with the surface 104. The difference between one or more characteristics (e.g., frequency, amplitude, and/or phase) of the modified baseline signal 124 and the modified measurement signal 128 can be associated with a change caused by the surface 104.

The baseline signal 120 and the measurement signal 126 each can be any signal that is capable of propagating through the user 102 via at least one or more of the user's bones 122A-122H. The propagation of one or more signals through one or more bones of an individual, such as the user 102, is referred to herein as "bone conduction." It should be understood that at least a portion of a given signal may propagate through other parts of the body of the user 102, such as soft tissue and/or skin, in addition to at least a portion of the user's bones 122A-112H.

The baseline signal 120 can be generated to have any frequency, amplitude, and/or phase characteristics suitable for transmission through the body of the user 102. The measurement signal 126 can be generated to have any frequency, amplitude, and/or phase characteristics suitable for transmission through the body of the user 102 and the surface 104. In some embodiments, the baseline signal 120 and/or the measurement signal 126 are generated after a setup process during which the user device 106 transmits a plurality of signals through the body of the user 102 and/or the surface 104 in order to determine signal characteristics that are suitable for transmission through the body of the user 102 and/or the surface 104.

The user device 106 can receive the modified baseline signal 124 and the modified measurement signal 128 via one or more device side transducer(s) 130. The device side transducer(s) 130, in some embodiments, are piezoelectric transducers, such as contact microphones or other electro-acoustic transducers. The device side transducer(s) 130 can be built-in to the user device 106. The device side transducer(s) 130 can be attached to the user device 106. The device side transducer(s) 130 can be built-in to a case that is placed on the user device 106. The device side transducer(s) 130 can be built-in to a display (not shown) of the user device 106 and/or any other component of the user device 106. As such, the device side transducer(s) 130 being built-in to the user device 106 in the illustrated embodiment should not be construed as being limiting in any way.

The user device 106 can execute, via one or more processors (best shown in FIG. 8), of one or more applications 132 and/or one or more operating systems 134. The application(s) 132 can include, but are not limited to, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, and the like. The application(s) 132 can execute on top of the operating system(s) 134.

The operating system 134 is a program for controlling the operation of the user device 106. The operating system(s) 134 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The illustrated user device 106 also includes a signal generator module 136 that can be executed by one or more processors of the user device 106 to generate the baseline signal 120, the measurement signal 126, and any other signals described herein. The signal generator module 136, in some embodiments, is included in the operating system 134 and accessible by one or more applications, such as the application(s) 132, to cause the signal generator module 136 to generate one or more signals. In some other embodiments, the signal generator module 136 is a stand-alone application or is included in one or more of the application(s) 132.

The illustrated user device 106 also includes a signal comparator module 138 that can be executed by one or more processors of the user device 106 to compare the modified baseline signal 124 to the baseline signal 120 to determine body characteristics of the user 102 and to compare the measurement signal 126 to the modified baseline signal 124 to determine how the surface 104 affects characteristics of the measurement signal 126. The signal comparator module 138, in some embodiments, is included in the operating system(s) 134 and accessible by one or more applications, such as the application(s) 132. In some other embodiments, the signal comparator module 138 is a stand-alone application or is included in one or more of the application(s) 132.

The illustrated user device 106 also includes a device-side reference database 140. The device-side reference database 140 can include the same data or similar data such the data stored in the reference database 116. In some embodiments, the user device 106 backs up data stored in the device-side reference database 140 to the reference database 116. In some other embodiments, the user device 106 uses either the device-side reference database 140 or the reference database 116. The example data 200 shown in FIG. 2 can be provided by the device-side reference database 140.

The device-side reference database 140 can be constructed and enhanced through repeated use of the methods described herein for capturing data about the surface 104, the controllable device(s) 108, and/or the user interaction(s). In some implementations, data provided by the device-side reference database 140 is crowd-sourced from multiple user devices. Identification of the surface 104 can accompany data captured using the passive and active methods described herein. The known impacts of the body of the user 102 can be removed prior to sending the data or can be sent along with the data to be removed later. Machine learning can be used to assemble the data into the device-side reference database 140 to be used for real-time or near real-time identification of the surface 104.

FIG. 1 illustrates one user 102, one surface 104, one user device 106, multiple controllable devices 108, one local network 110, one reference server 112, one network 114, one reference database 116, multiple user-side transducers 118, one baseline signal 120, multiple bones 122A-122H, one modified baseline signal 124, one measurement signal 126, one modified measurement signal 128, one signal generator module 136, one signal comparator module 138, and one device-side reference database 140. It should be understood, however, that various implementations of the operating environment 100 can include multiple users 102, multiple surfaces 104, multiple user devices 106, one controllable device 108, multiple local networks 110, multiple reference servers 112, multiple networks 114, one reference database 116, multiple user-side transducers 118, one baseline signal 120, multiple bones 122A-122H, one modified baseline signal 124, one measurement signal 126, one modified measurement signal 128, one signal generator module 136, one signal comparator module 138, and one device-side reference database 140. As such, the illustrated embodiment should be understood as being illustrative, and should not be construed as being limiting in any way.

Figure 3:
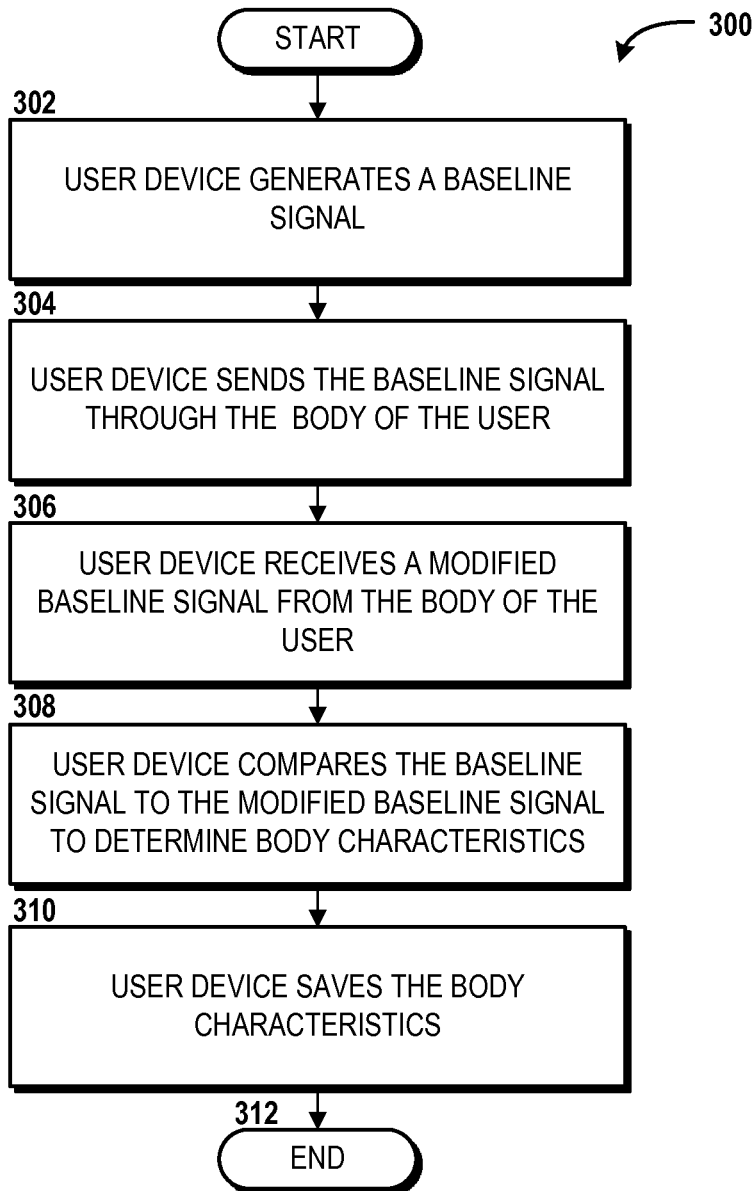
FIG. 3 is a flow diagram illustrating aspects of a method for determining body characteristics of a user, according to an illustrative embodiment.

Turning now to FIG. 3, aspects of a method 300 for determining body characteristics of a user, such as the user 102, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 106, the controllable device(s) 108, the reference server 112, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the user device 106, the controllable device(s) 108, and/or the reference server 112 to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 106, via execution of one or more software modules and/or software applications, such as the application(s) 132, the operating system(s) 134, the signal generator module 136, and/or the signal comparator module 138. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 1. The method 300 begins at operation 302, where the user device 106 executes the signal generator module 136 to generate a baseline signal, such as the baseline signal 120. From operation 302, the method 300 proceeds to operation 304, where the user device 106 sends, via the device-side transducer(s) 130 the baseline signal 120 through the body of the user 102. From operation 304, the method 300 proceeds to operation 306, where the user device 106 receives, via the device-side transducer(s) 130, a modified baseline signal, such as the modified baseline signal 124, from the body of the user 102.

From operation 306, the method 300 proceeds to operation 308, where the user device 106 executes the signal comparator module 138 to compare the baseline signal 120 to the modified baseline signal 124 to determine one or more body characteristics of the body of the user 102. The body characteristics can include one or more signal characteristics (e.g., amplitude, frequency, and/or phase) that result from the baseline signal 120 being modified during propagation through the body of the user 102. From operation 308, the method 300 proceeds to operation 310, where the user device 106 saves the body characteristics. The body characteristics can be removed from future signals, for example, to isolate the effects of the surface 104 as will be described with reference to FIG. 4.

From operation 310, the method 300 proceeds to operation 312. The method 300 ends at operation 312.

Figure 4:
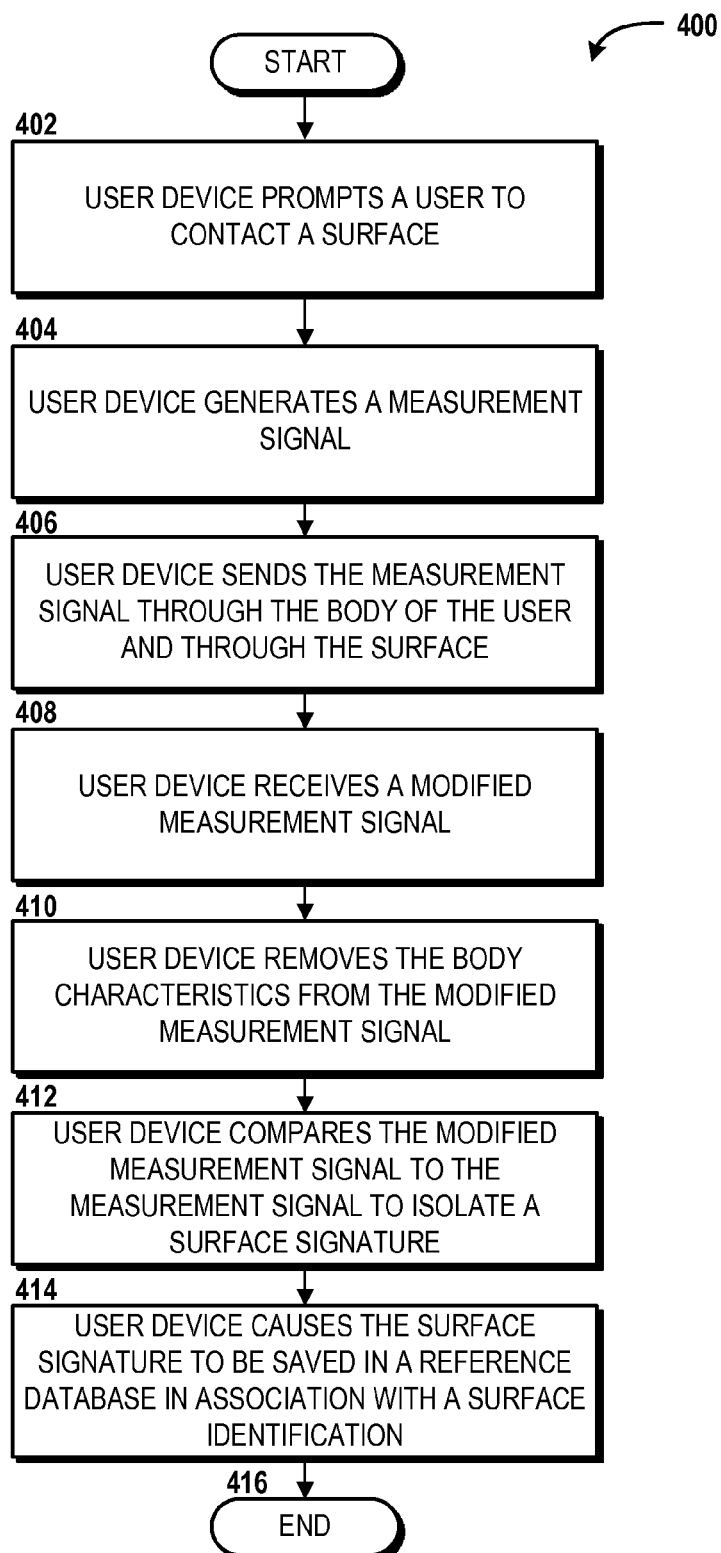
FIG. 4 is a flow diagram illustrating aspects of a method for determining a surface signature, according to an illustrative embodiment.

Turning now to FIG. 4, a method 400 for determining a surface signature of a surface, such as the surface 104 will be described, according to an illustrative embodiment. The method 400 will be described with reference to FIG. 4 and further reference to FIG. 1. The method 400 begins at operation 402, where the user device 106 prompts a user, such as the user 102, to contact a surface, such as the surface 104. From operation 402, the method proceeds to operation 404, where the user device 106 executes the signal generator module 136 to generate a measurement signal, such as the measurement signal 126. From operation 404, the method 400 proceeds to operation 406, where the user device 106 sends, via the device-side transducer(s) 130 the measurement signal 126 through the body of the user 102 and through the surface 104. From operation 406, the method 400 proceeds to operation 408, where the user device 106 receives, via the device-side transducer(s) 130, a modified measurement signal, such as the modified measurement signal 128, from the body of the user 102.

From operation 408, the method 400 proceeds to operation 410, where the user device 106 removes the body characteristics (e.g., the body characteristics determined above during the method 300) from the modified measurement signal 128. From operation 410, the method 400 proceeds to operation 412, where the user device 106 executes the signal comparator module 138 to compare the modified measurement signal 128 sans the body characteristics to the measurement signal 126 to isolate signal characteristics indicative of how the surface 104 effects the measurement signal 126. Signal characteristics indicative of how a surface effects a measurement signal are referred to herein as a "surface signature."

From operation 412, the method 400 proceeds to operation 414, where the user device 106 causes the surface signature to be saved in a reference database, such as the reference database 116 and/or the device-side reference database 140, in association with a surface identification, such as one of the surface identifications 202 described above with reference to FIG. 2.

From operation 414, the method 400 proceeds to operation 416. The method 400 ends at operation 416.

Figure 5:
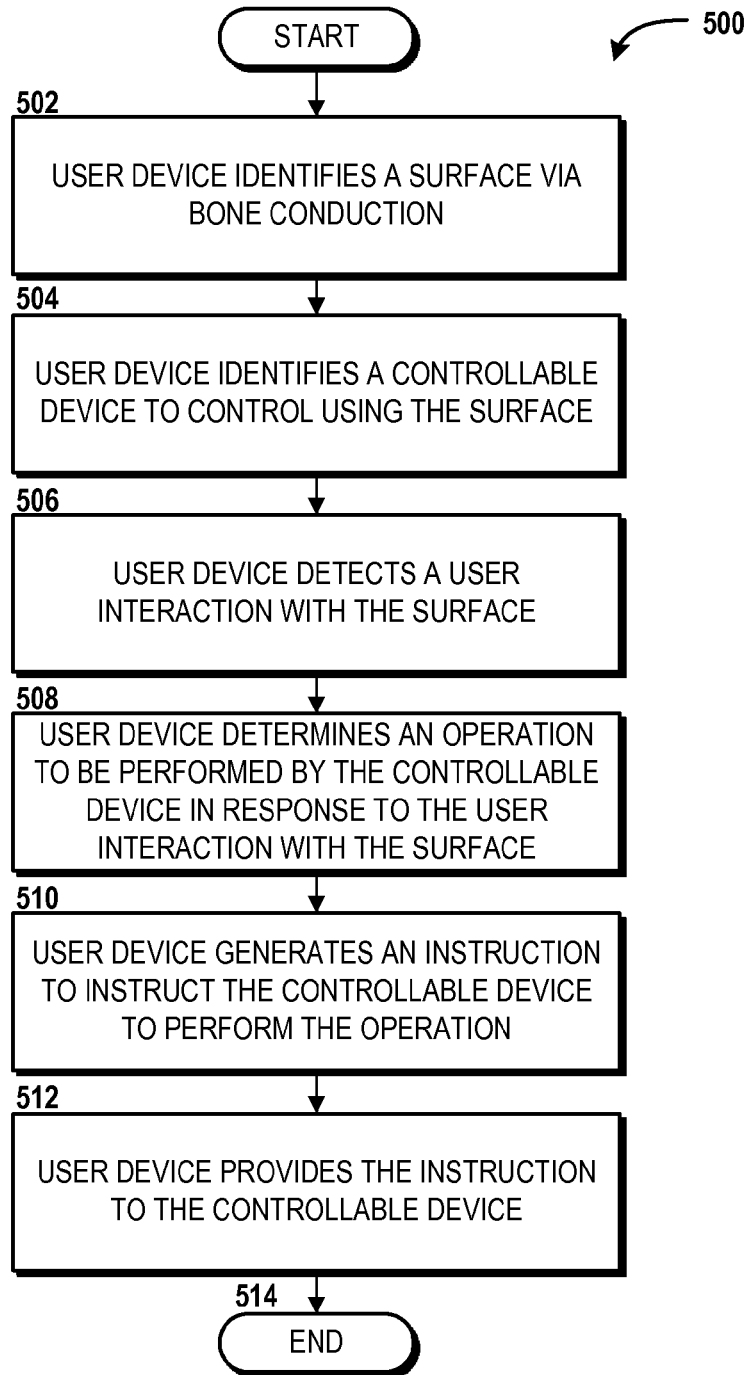
FIG. 5 is a flow diagram illustrating aspects of a method for identifying a surface and using the surface to control a controllable device, according to an illustrative embodiment.

Turning now to FIG. 5, a flow diagram illustrating aspects of a method 500 for identifying a surface, such as the surface 104, and using the surface 104 to control a controllable device, such as the controllable device 108, will be described according to an illustrative embodiment. The method 500 will be described with reference to FIG. 5 and further reference to FIG. 1. The method 500 begins at operation 502, where the user device 106 identifies the surface 104 via bone conduction. The user device 106 can execute the signal generator module 136 to generate a measurement signal, such as the measurement signal 126. The user device 106 can send, via the device-side transducer(s) 130, the measurement signal 126 through the body of the user 102 to the surface 104. The user device 106 can receive, via the device-side transducer(s) 130, the measurement signal 126 as modified by the body of the user 102 and the surface 104 (i.e., the modified measurement signal 128). The user device 106 can execute the signal comparator module 138 to remove the body characteristics of the user 102 (e.g., as determined in the method 300) and to compare the resulting signal to the measurement signal 126 to isolate a surface signature indicative of the surface 104. The user device 106 can generate a query directed to a reference database, such as the reference database 116 and/or the device-side reference database 140, to perform a lookup process to determine whether the surface signature is associated with any of the surface identifications 202. If so, the reference database can return the matching surface identification to the user device 106 so that the user device 106 can identify the surface 104.

From operation 502, the method 500 proceeds to operation 504, where the user device 106 identifies a controllable device, such as one of the controllable devices 108, to control using the surface 104. The user device 106 in the aforementioned query to a reference database or in a separate query to a reference database can request one or more of the controllable device identifications 204 that are associated with the surface identification that matches the surface 104 as identified in operation 502.

Figure 6:
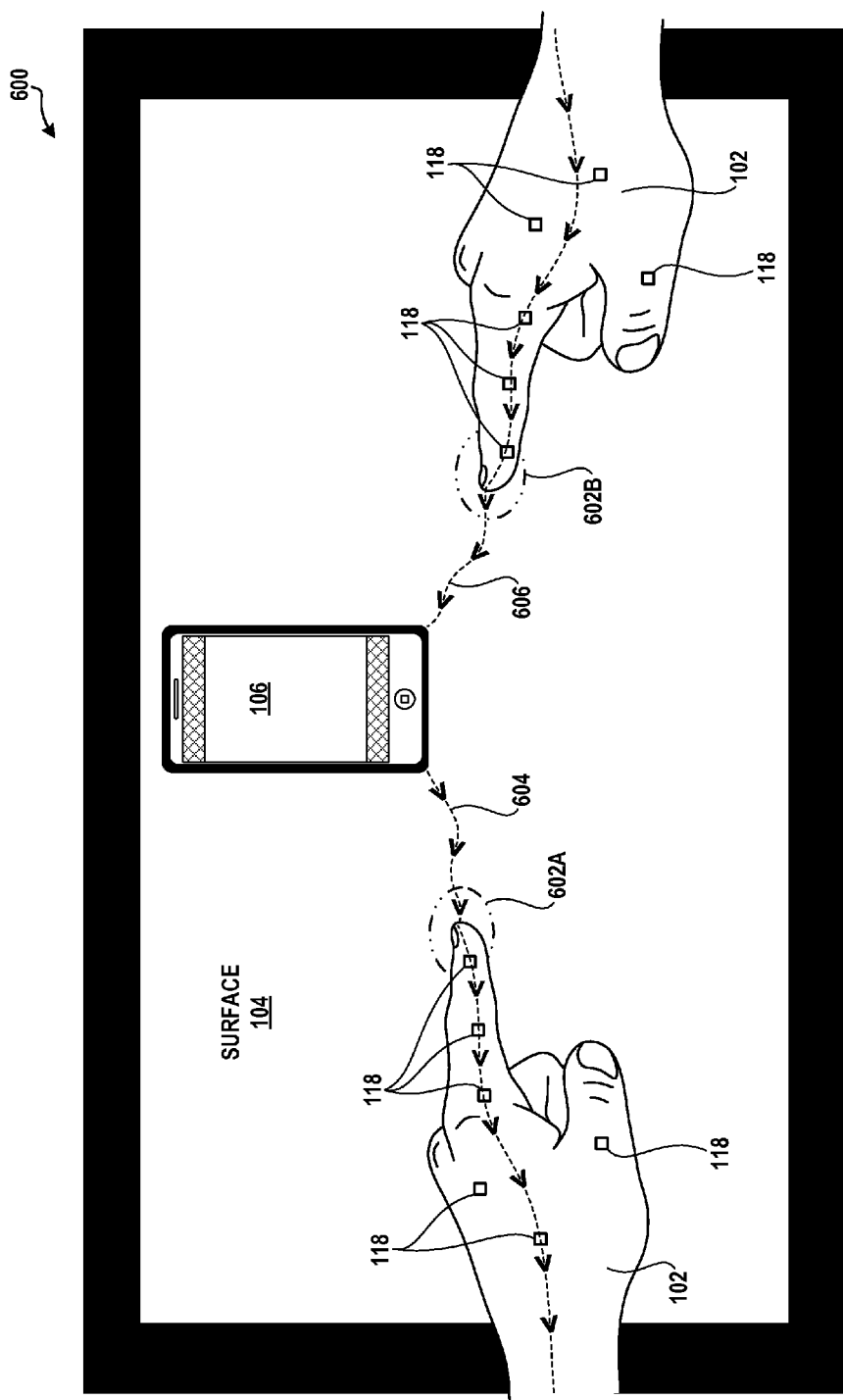
FIG. 6 is a diagram illustrating aspects of a user interaction with a surface, according to an illustrative embodiment.

From operation 504, the method 500 proceeds to operation 506, where the user device 106 detects a user interaction with the surface 104. The user device 106 can detect a user interaction with the surface 104 via a method 700 described below with reference to FIG. 7. An example user interaction is shown in FIG. 6, which is described below with reference to FIG. 6.

From operation 506, the method 500 proceeds to operation 508, where the user device 106 determines an operation to be performed by the controllable device 108 in response to the user interaction with the surface 104. The user device 106 in any of the aforementioned queries to a reference database or in a separate query to a reference database can request one or more of the user interaction identifications 206 that are associated with the user interaction detected at operation 506. The user interaction identification(s) 206 can be mapped to one or more operations of the controllable device 108 identified at operation 504.

From operation 508, the method 500 proceeds to operation 510, where the user device generates an instruction to instruct the controllable device 108 identified at operation 504 to perform the operation determined at operation 508. From operation 510, the method 500 proceeds to operation 512, where the user device 106 provides the instruction to the controllable device 108. The controllable device 108 can receive the instruction, analyze the instruction to determine the operation(s) to be performed, and perform the operation(s) in response.

From operation 512, the method proceeds to operation 514. The method 500 ends at operation 514.

Turning now to FIG. 6, a diagram 600 illustrating aspects of a user interaction with a surface, such as the surface 104, will be described, according to an illustrative embodiment. In the illustrated example, the user 102 is in contact with the surface 104 using his or her pointer finger on both hands at two touch points 602A, 602B. The user device 106 is shown placed on the surface 104, but may alternatively be held by the user 102 or may be otherwise in contact with the user 102 such as in a pocket of an article of clothing worn by the user 102. The user device 106 can execute the signal generator module 136 to generate a gesture measurement signal 604 and can send, via the device-side transducer(s) 130, the gesture measurement signal 604 to the surface 104 as in the illustrated embodiment or directly to the user in an alternative embodiment. In the illustrated embodiment, the gesture measurement signal 604 can propagate through at least a portion of the surface 104 into the body of the user 102 via the touch point 602A. While the gesture measurement signal 604 is being sent by the user device 106, the user 102 can manipulate his or her pointer fingers to perform a user interaction such as one of the gestures described above herein. For example, the user 102 can perform a pinch and stretch gesture in which the user 102 makes a pinching motion with his or her forefingers on the surface 104 or moves the forefingers apart in a stretching motion. The pinch and stretch gesture may be used for various reasons including, but not limited to, zooming gradually in or out of a website, map, or picture that is presented on a display associated with one or more of the controllable devices 108. Other gestures, such as those described above herein, are contemplated, and as such, the pinch and stretch gesture should not be construed as being limiting in any way.

While the user 102 is performing a user interaction, the gesture measurement signal 604 as modified by the surface 104 and the body of the user 102 can propagate back into the surface 104 as a modified gesture measurement signal 606. The user device 106 can receive, via the device-side transducer(s) 130, the modified gesture measurement signal 606 and can compare, by executing the signal comparator module 138, the modified gesture measurement signal 606 to a reference database, such as the reference database 116 and/or the device-side reference database 140, to determine the gesture performed by the user 102, which in the above example is a pinch and stretch gesture.

Figure 7:
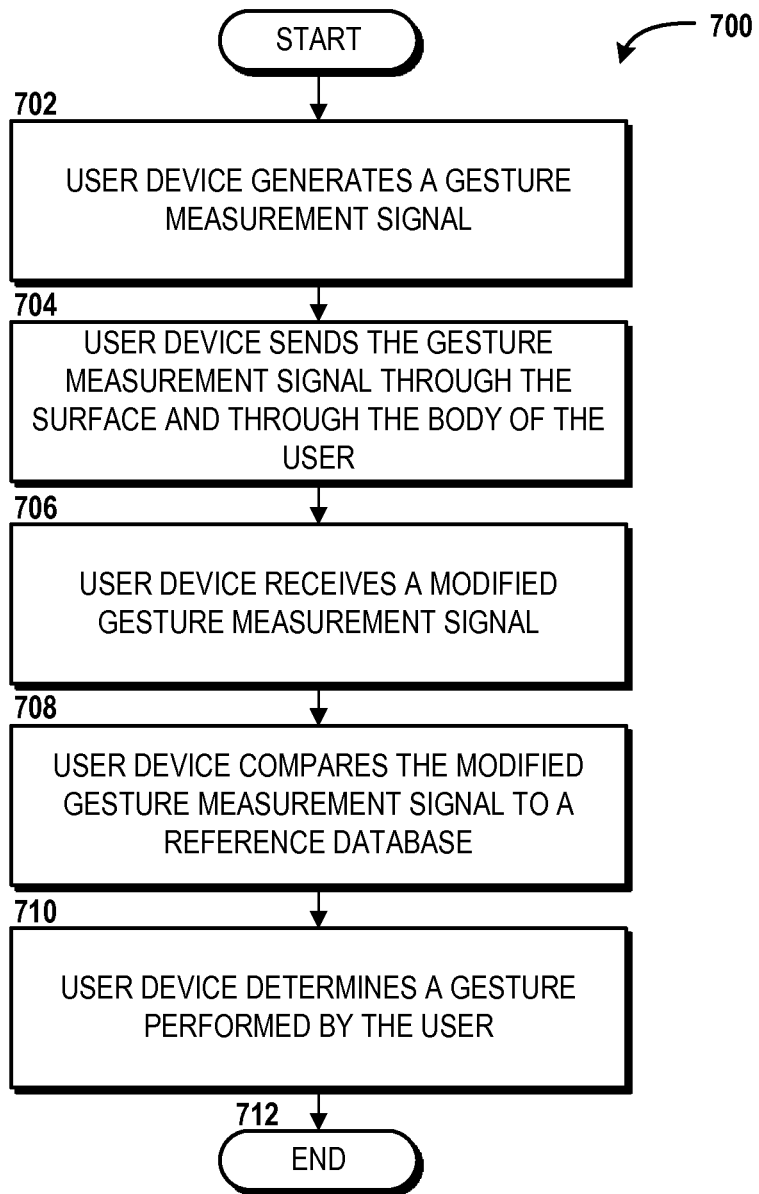
FIG. 7 is a flow diagram illustrating aspects of a method for determining a gesture performed by a user, according to an illustrative embodiment.

Turning now to FIG. 7, a flow diagram illustrating aspects of a method 700 for determining a gesture performed by a user, such as the user 102, will be described, according to an illustrative embodiment. The method 700 will be described with reference to FIG. 7 and further reference to FIGS. 1 and 6. The method 700 begins at operation 702, where the user device 106 executes the signal generator module 136 to generate a gesture measurement signal, such as the gesture measurement signal 604 shown in FIG. 6. From operation 702, the method 700 proceeds to operation 704, where the user device 106 sends, via the device-side transducer(s) 130, the gesture measurement signal 604 through the surface 104 and the body of the user 102. From operation 704, the method 700 proceeds to operation 706, where the user device 106 receives a modified gesture measurement signal, such as the modified gesture measurement signal 606.

From operation 706, the method 700 proceeds to operation 708, where the user device 106 executes the signal comparator module 138 to compare the modified gesture measurement signal 606 to the user interaction identification(s) 206 stored in a reference database, such as the reference database 116 and/or the device-side reference database 140. From operation 708, the method 700 proceeds to operation 710, where the user device 106 determines a gesture performed by the user 102 based upon the comparison made at operation 708.

From operation 710, the method 700 proceeds to operation 712. The method 700 ends at operation 712.

Figure 8:
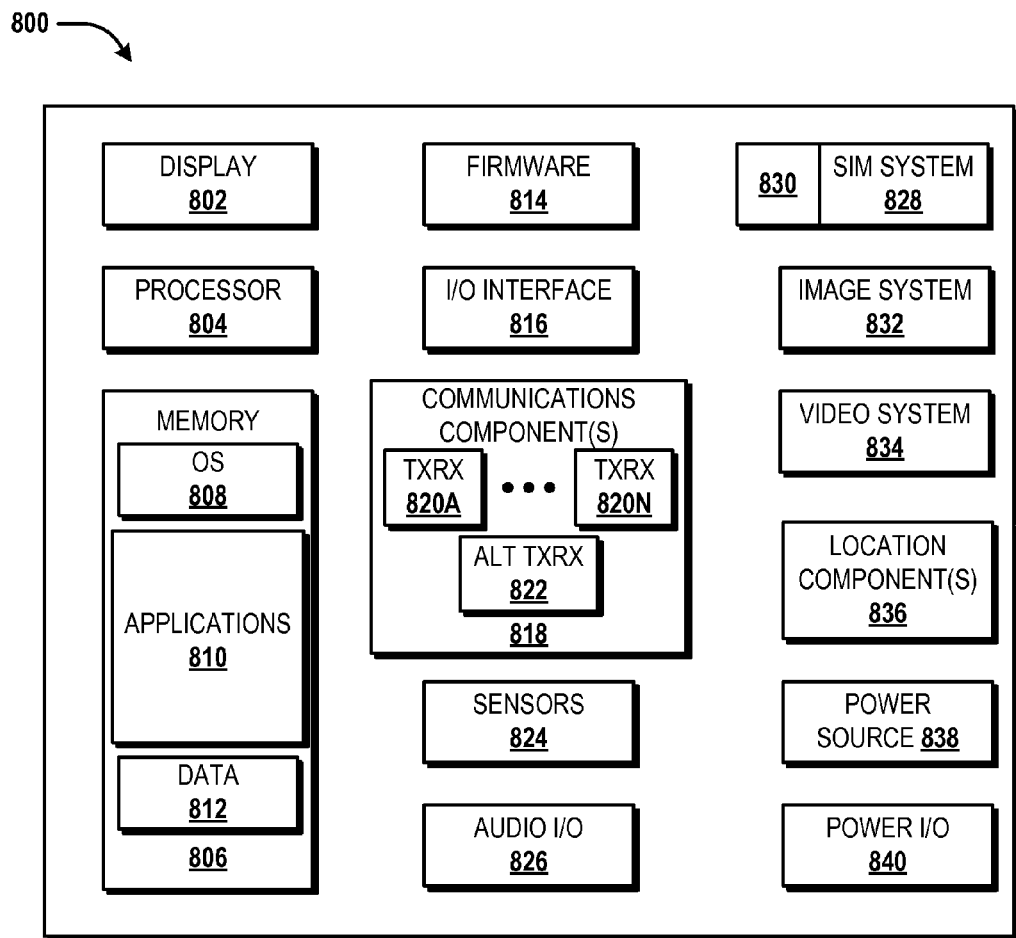
FIG. 8 is a block diagram illustrating an example mobile device capable of implementing aspects of the embodiments disclosed herein.

Turning now to FIG. 8, an illustrative mobile device 800 and components thereof will be described. In some embodiments, the user device 106 described above with reference to FIG. 1 can be configured as and/or can have an architecture similar or identical to the mobile device 800 described herein in FIG. 8. It should be understood, however, that the user device 106 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808 (e.g., the operating system 134), one or more applications 810 (e.g., the application(s) 132, the signal generator module 136, and/or the signal comparator module 138), other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPO- RATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the example data 200 stored in the device-side reference database 140. According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 114 described above herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, IRDA, NFC, other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, A-GPS devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
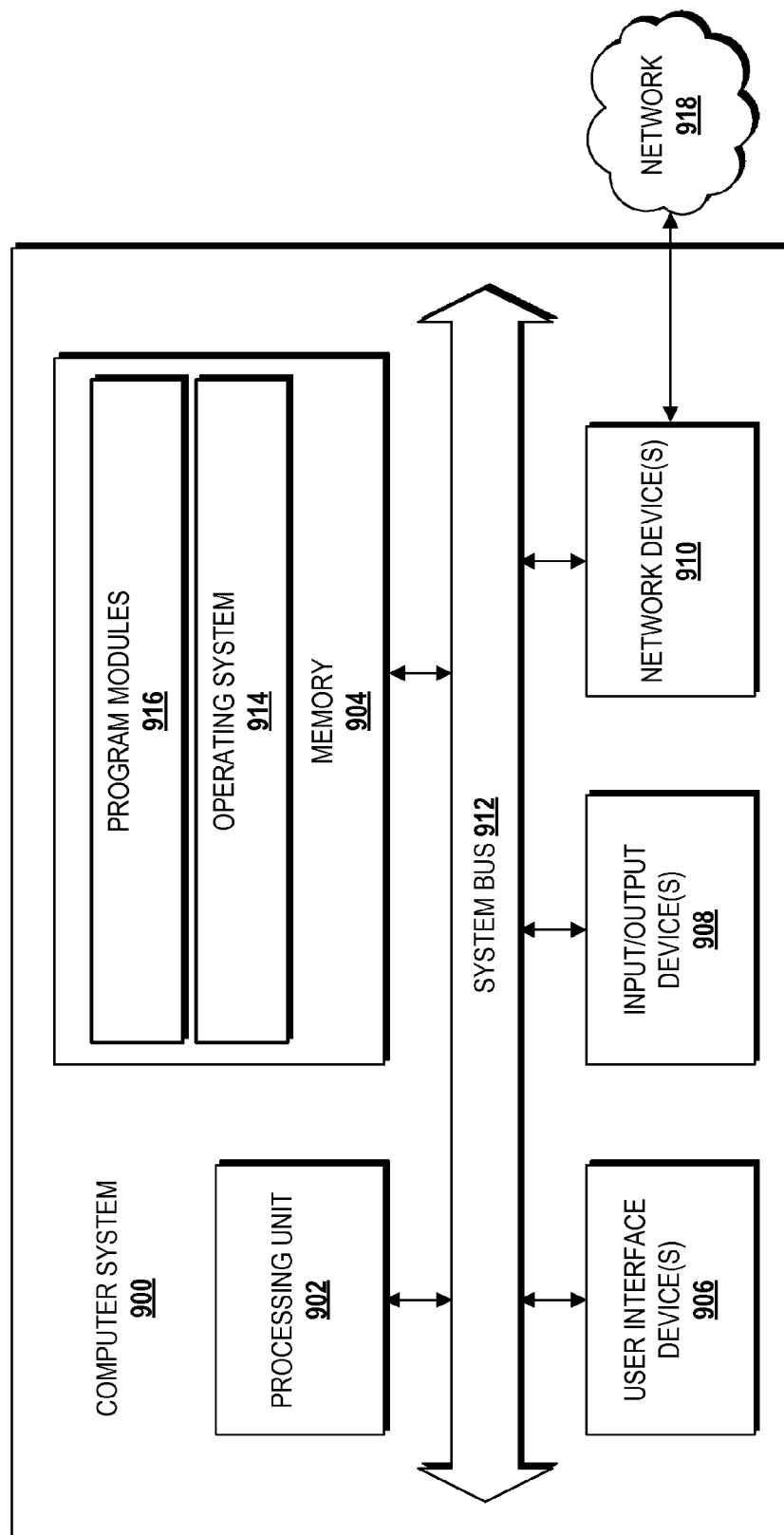
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some implementations, the user device 106 and/or the reference server 112 utilize an architecture that is the same as or similar to the architecture of the computer system 900. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 can include the application(s) 132, the signal generator module 136, and/or the signal comparator module 138 in embodiments that the user device 106 is configured like the computer system 900. The program modules 916 and/or other programs can be embodied in computer-readable media containing instructions that, when executed by the processing unit 902, perform one or more of the methods 300, 400, 500, 700 or at least a portion thereof, described in detail above with respect to FIGS. 3-5 and 7. According to embodiments, the program modules 916 may be embodied in hardware, software, firmware, or any combination thereof. Although not shown in FIG. 9, it should be understood that the memory 904 also can be configured to store the device-side reference database 140 or the reference database 116, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 918, such as the network 114 and/or the local network 110. Examples of the network devices 910 include, but are not limited to, a modem, a radio frequency ("RF") or infrared ("IR") transceiver, a telephonic interface, a bridge, a router, or a network card. The network 918 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 918 may be a wired network such as, but not limited to, a wide area network ("WAN"), a wired LAN such as provided via Ethernet, a wired personal area network n ("PAN"), or a wired metropolitan area network ("MAN").

Figure 10:
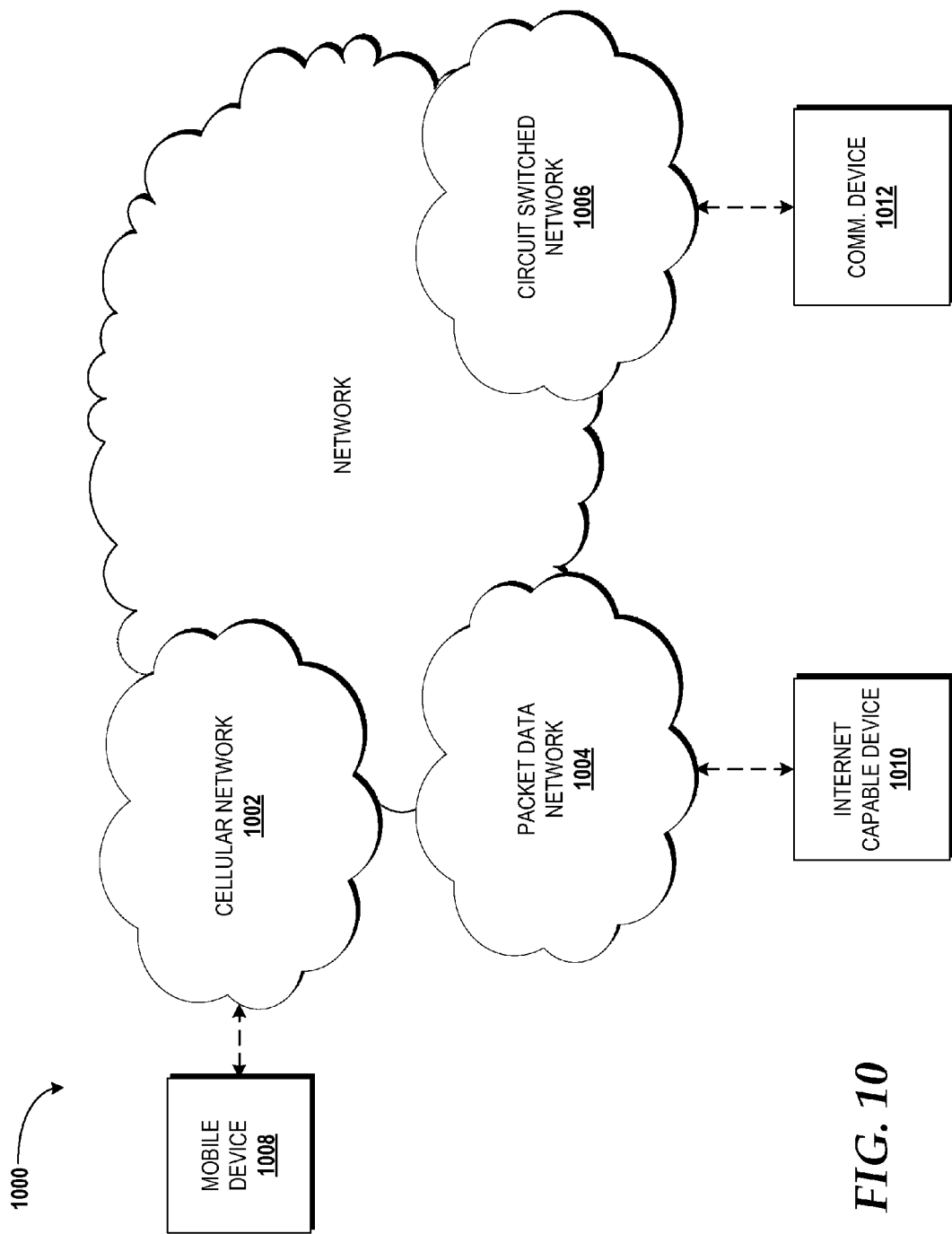
FIG. 10 schematically illustrates a network, according to an illustrative embodiment.

Turning now to FIG. 10, additional details of a network 1000, such as the network 114, are illustrated, according to an illustrative embodiment. The network 1000 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the user device 106, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system (POTS). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the user device 106, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, the user device 106, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. In the specification, the network 114 is used to refer broadly to any combination of the networks 1002, 1004, 1006. It should be appreciated that substantially all of the functionality described with reference to the network 114 can be performed by the cellular network 1002, the packet data network 1004, and/or the circuit switched network 1006, alone or in combination with other networks, network elements, and the like.

Based on the foregoing, it should be appreciated that concepts and technologies directed to surface determination via bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    identifying, by a user device, a surface via bone conduction, wherein the identifying comprises
        generating a bone conduction signal,
        sending the bone conduction signal through a bone of a user and through the surface,
        receiving a modified bone conduction signal comprising the bone conduction signal as modified by the bone of the user and the surface,
        removing, from the modified bone conduction signal, a body characteristic associated with an effect of the bone of the user on the bone conduction signal,
        comparing the modified bone conduction signal sans the body characteristic to a plurality of surface signatures of a reference database, and
        receiving, from the reference database, a surface identification associated with a surface signature of the plurality of surface signatures, wherein the surface signature uniquely identifies the surface to the user device;
    identifying, by the user device, a controllable device to control using the surface;
    detecting, by the user device, a user interaction with the surface; and
    providing, by the user device, an instruction to the controllable device to cause the controllable device to perform an operation in response to the user interaction with the surface.

2. The method of claim 1, wherein identifying, by the user device, the controllable device to control using the surface comprises:
    querying the reference database to determine whether any controllable device is associated with the surface signature; and
    receiving, from the reference database, a controllable device identification associated with the controllable device, the controllable device identification identifying the controllable device to the user device.

3. The method of claim 2, further comprising establishing, by the user device, a connection to the controllable device via a local network; and wherein providing, by the user device, the instruction to the controllable device to cause the controllable device to perform the operation in response to the user interaction comprises providing, by the user device, the instruction to the controllable device via the connection established via the local network.

4. The method of claim 1, wherein detecting, by the user device, the user interaction with the surface comprises detecting, by the user device, a gesture performed by a user who is in physical contact with the surface, the gesture being detected by the user device via bone conduction.

5. The method of claim 4, wherein detecting, by the user device, the gesture performed by the user who is in physical contact with the surface comprises:
    generating a gesture measurement signal;
    sending the gesture measurement signal through the bone of the user and through the surface while the user is in physical contact with the surface;
    receiving a modified gesture measurement signal, the modified gesture measurement signal comprising the gesture measurement signal as modified by the bone of the user and the surface;
    comparing the modified gesture measurement signal to a plurality of user interaction identifications of the reference database, each of the plurality of user interaction identifications being associated with signal characteristics of a user interaction; and
    determining, based upon comparing the modified gesture measurement signal to the reference database, the gesture.

6. The method of claim 1, further comprising:
    prompting the user to contact the surface;
    generating a measurement signal;
    sending the measurement signal through the bone of the user and through the surface;
    receiving a modified measurement signal;
    removing, from the modified measurement signal, the body characteristic associated with the effect of the bone of the user on the measurement signal;
    comparing the modified measurement signal sans the body characteristic associated with the effect of the bone of the user on the measurement signal to the measurement signal to isolate the surface signature associated with the surface; and
    causing the surface signature to be saved in the reference database in association with the surface identification.

7. A user device comprising:
    a transducer;
    a processor; and
    a memory that stores computer-readable instructions that, when executed by the processor, causes the processor to perform operations comprising:
        identifying a surface via bone conduction, wherein the identifying comprises generating a bone conduction signal,
        sending, via the transducer, the bone conduction signal through a bone of a user and through the surface, receiving, via the transducer, a modified bone conduction signal, the modified bone conduction signal comprising the bone conduction signal as modified by the bone of the user and the surface, removing, from the modified bone conduction signal, a body characteristic associated with an effect of the bone of the user on the bone conduction signal, comparing the modified bone conduction signal sans the body characteristic to a plurality of surface signatures of a reference database, and receiving, from the reference database, a surface identification associated with a surface signature of the plurality of surface signatures, wherein the surface signature uniquely identifies the surface to the user device, identifying a controllable device to control using the surface, detecting a user interaction with the surface, and providing an instruction to the controllable device to cause the controllable device to perform an operation in response to the user interaction with the surface.

8. The user device of claim 7, wherein identifying the controllable device to control using the surface comprises:

querying the reference database to determine whether any controllable device is associated with the surface signature; and receiving, from the reference database, a controllable device identification associated with the controllable device, the controllable device identification identifying the controllable device to the user device.

9. The user device of claim 8, wherein the operations further comprise establishing a connection to the controllable device via a local network; and wherein providing the instruction to the controllable device to cause the controllable device to perform the operation in response to the user interaction comprises providing, by the user device, the instruction to the controllable device via the connection established via the local network.

10. The user device of claim 7, wherein detecting the user interaction with the surface comprises detecting a gesture performed by a user who is in physical contact with the surface, the gesture being detected by the user device via bone conduction.

11. The user device of claim 10, wherein detecting, by the user device, the gesture performed by the user who is in physical contact with the surface comprises:

generating a gesture measurement signal;

sending the gesture measurement signal through a bone of the user and through the surface while the user is in physical contact with the surface;

receiving a modified gesture measurement signal, the modified gesture measurement signal comprising the gesture measurement signal as modified by the bone of the user and the surface;

comparing the modified gesture measurement signal to a plurality of user interaction identifications of the reference database, each of the plurality of user interaction identifications being associated with signal characteristics of a user interaction; and determining, based upon comparing the modified gesture measurement signal to the reference database, the gesture.

12. The user device of claim 7, wherein the operations further comprise prompting the user to contact the surface;

generating a measurement signal;

sending the measurement signal through the bone of the user and through the surface;

receiving a modified measurement signal;

removing, from the modified measurement signal, the body characteristic associated with the effect of the bone of the user on the measurement signal;

comparing the modified measurement signal sans the body characteristic associated with the effect of the bone of the user on the measurement signal to the measurement signal to isolate the surface signature associated with the surface; and causing the surface signature to be saved in the reference database in association with the surface identification.

13. A computer-readable storage medium having instructions stored thereon that, when executed by a processor of a user device, cause the user device to perform operations comprising:

identifying a surface via bone conduction, wherein the identifying comprises generating a bone conduction signal, sending the bone conduction signal through a bone of a user and through the surface, receiving a modified bone conduction signal, the modified bone conduction signal comprising the bone conduction signal as modified by the bone of the user and the surface, removing, from the modified bone conduction signal, a body characteristic associated with an effect of the bone of the user on the bone conduction signal, comparing the modified bone conduction signal sans the body characteristic to a plurality of surface signatures of a reference database, and receiving, from the reference database, a surface identification associated with a surface signature of the plurality of surface signatures, wherein the surface signature uniquely identifies the surface to the user device;

identifying a controllable device to control using the surface;

detecting a user interaction with the surface; and providing an instruction to the controllable device to cause the controllable device to perform an operation in response to the user interaction with the surface.

14. The computer-readable storage medium of claim 13, wherein identifying the controllable device to control using the surface comprises:

querying the reference database to determine whether any controllable device is associated with the surface signature; and receiving, from the reference database, a controllable device identification associated with the controllable device, the controllable device identification identifying the controllable device to the user device.

15. The computer-readable storage medium of claim 14, wherein the operations further comprise establishing a connection to the controllable device via a local network; and wherein providing the instruction to the controllable device to cause the controllable device to perform the operation in response to the user interaction comprises providing the instruction to the controllable device via the connection established via the local network.

16. The computer-readable storage medium of claim 13, wherein detecting the user interaction with the surface comprises:

generating a gesture measurement signal;

sending the gesture measurement signal through a bone of a user and through the surface while the user is in physical contact with the surface;

receiving a modified gesture measurement signal, the modified gesture measurement signal comprising the gesture measurement signal as modified by the bone of the user and the surface;

comparing the modified gesture measurement signal to a plurality of user interaction identifications of the reference database, each of the plurality of user interaction identifications being associated with signal characteristics of a user interaction; and determining, based upon comparing the modified gesture measurement signal to the reference database, the gesture.

17. The computer-readable storage medium of claim 13, wherein the operations further comprise:

prompting the user to contact the surface;

generating a measurement signal;

sending the measurement signal through the bone of the user and through the surface;

receiving a modified measurement signal;

removing, from the modified measurement signal, the body characteristic associated with the effect of the bone of the user on the measurement signal;

comparing the modified measurement signal sans the body characteristic associated with the effect of the bone of the user on the measurement signal to the measurement signal to isolate the surface signature associated with the surface; and causing the surface signature to be saved in the reference database in association with the surface identification.

* * * * *